Oct. 9, 1945.   C. L. MEYER   2,386,253
BEARING AND RETAINER PULLER
Filed Jan. 8, 1944
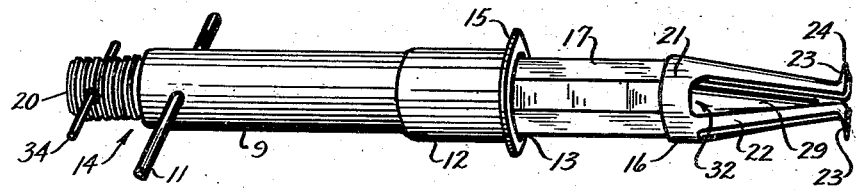
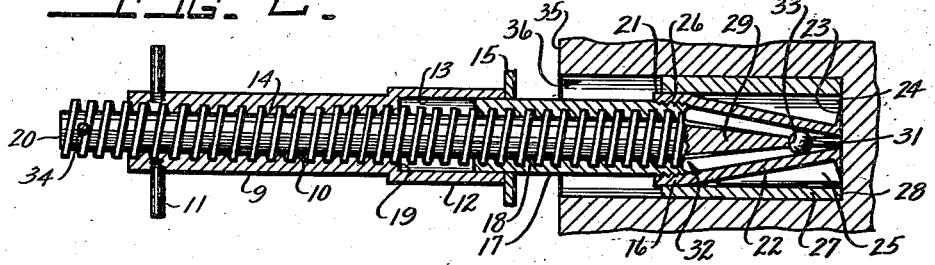
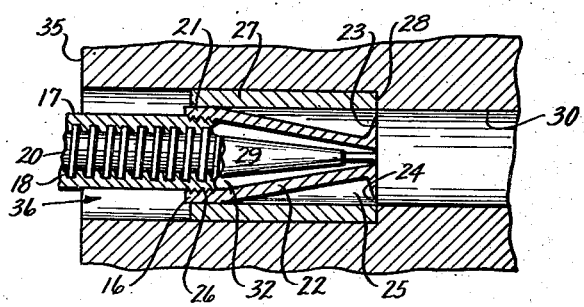
INVENTOR
CLARENCE L. MEYER
BY
ATTORNEYS Patented Oct. 9, 1945

2,386,253

UNITED STATES PATENT OFFICE 2,386,253

BEARING AND RETAINER PULLER

Clarence L. Meyer, Dayton, Ohio

Application January 8, 1944, Serial No. 517,516

3 Claims. (Cl. 29—265)

(Granted under the act of March 3, 1883, as amended April 30, 1928; 370 O. G. 757)

The invention described herein may be manufactured and used by or for the Government for governmental purposes, without the payment to me of any royalty thereon.

This invention pertains to tools, and more particularly to tools for pulling hollow sleeve-like or ring-like bearings, races, retainers, bushings, and the like, referred to hereinafter as bearings, from their sockets, seats, etc.

An object of the invention is to improve the utility and operation of pullers of the character disclosed in United States Patents Nos. 1,650,024 and 1,728,248.

Heretofore, in order to remove a bearing seated in a socket, or other inaccessible location, upon a planar surface closing the opening through the bearing on a plane with that of the end of the bearing, it has been necessary to engage the inner walls of the bearing, due to the construction of conventional pullers, in order to exert extracting forces for the removal of the bearing. In order to engage the rear end of a bearing with a tool of prior art construction, it is necessary to project the engaging portions of the tool beyond the plane of the rear end of the bearing. This, of course, can not be done in instances where the bearing seat is not provided with an opening in axial alignment with the opening through the bearing.

Furthermore, known tools of the character have extremely limited application, that is, a different sized tool is necessary for practically every bearing having a difference in the diameter of the opening therethrough and universal usage is limited by the lack of interchangeability of means of expanding the bearing-engaging fingers.

An object of the invention is to provide a puller capable of passing through bushings, bearings, etc., of various sized openings and capable of being expanded to engage bearings of such varying sizes for extraction from their seats.

A further object of the invention is to provide a puller which is capable of wedgingly forcing a bearing from a seat having a flat continuous surface across and closing the bearing passageway on a plane with the rear end of the bearing, and further capable of engaging the rear end thereof for extraction without engaging or marring the inner walls of the bearing.

A further object of the invention is to provide means whereby the bearing-engaging fingers of the tool may be expanded from single progressive points or over the entire length of the fingers.

A still further object of the invention is to provide means for expanding the fingers of the tool from points within the extremities of the fingers whereby projecting finger-expanding elements are eliminated.

With the foregoing and other objects and aims in view, my invention resides in the combination of parts and in the details of construction hereinafter set forth in the following specification and appended claims, certain embodiments which have the characteristics of my invention, and by which the same may be practiced, being illustrated in the accompanying drawing in which:

Fig. 1 is a perspective view of the assembled tool;

Fig. 2, a cross sectional view of an embodiment of the tool for pulling a bearing seated upon a surface closing the end of the bearing passageway; and Fig. 3, a sectionalized view of the end portion of an embodiment of the tool for pulling a bearing from a seat having an opening in axial alignment with that through the bearing.

Generally, the invention includes, as may be seen from the illustrated embodiment, a compression member and tension member, expansible bearing-engaging means on the tension member and means for simultaneously exerting compressional and tensional forces upon the compression and tension members respectively.

As will be seen from the drawing, the embodiment includes a sleeve 9 having inner threads 10, means for rotating the sleeve about its axis, such as a cross bar 11, an enlarged unthreaded end portion 12 the passageway 13 of which is of greater diameter than that of the passageway 14 through the threaded sleeve portion, and, as a compression member, laterally extending means such as a bar, flange, collar, shoulder or plate 15.

As a tension member, the embodiment includes a collet 16 having a sleeve portion 17 which is provided with inner threads 18 of a same directional pitch and diameter as the threads 10 of the sleeve 9. The outer diameter of the sleeve portion 17 of the collet is such as will slide into the passageway 13 of the enlarged unthreaded portion 12 of the sleeve which threaded portion forms a shoulder 19 where it joins the threaded portion of the sleeve 9.

In the embodiment illustrated the means for simultaneously exerting compressional and tensional forces upon the compression and tension members consists of a shaft 20 threaded to cooperate with the threads 10 and 18 of the compression sleeve 9 and the tension collet sleeve 17 respectively.

The collet 16 per se is a coned sleeve slotted from its smaller end to a ring-like base or supporting portion 21 to provide a plurality of resilient expansible fingers 22 the extremities of which are each provided with wedge-shaped bearing-engaging members 23 extending flatwise laterally and outward from the side extremities of the fingers, terminating in flat knife-like ends 24 on a plane 90° or more, but not less, with respect to the axis of the collet 16. The fingers 22 normally converge sufficiently to bring the overall cross sectional area of the wedges 23 within the limits of the cross sectional area of the finger-supporting base 21 of the collet in order that they may be inserted into any bearing passageway 25 into which the collet base 21 will pass. The collet is preferably removably secured to its sleeve-carrying member 17 as by cooperating threads indicated at reference character 26 in order that it may be exchanged, replaced, or removed for the insertion or extraction of replaceable finger expanding means.

The means for expanding the collet fingers to force the flat knifelike ends 24 of the bearing-engaging wedges between the end of a bearing 27 and its seat 28 consists of a tapered, preferably conical, end portion 29 of the force-exerting shaft 20. This conical end portion is truncated in order to provide a predetermined expanding force upon inner surfaces of the fingers, depending upon their convergence with respect to the angle of the conical shaft and, without protruding beyond the plane of the bottom surfaces of the wedges.

In instances where a bearing seat 28 happens to have an opening or passageway 30 in axial alignment with the bearing passageway 25, as illustrated in Fig. 3, the conical shaft end may be extended protrudingly beyond or through the plane of the wedge surfaces to bring about greater expansion of the fingers for adequate engagement with a bearing or for engagement with bearings having passageways considerably in excess of the cross sectional area of the normally contracted wedges. When the bearing is seated upon a surface closing the end of the bearing passageway, as illustrated in Fig. 2, and when the finger expansion required to free and engage the bearing is greater than that which may be accomplished by the conical shaft end when it abuts the seat upon which the wedges are positioned, supplemental finger expanding means 31 are provided. For convenience and satisfactory performance a spherical object, such as a steel ball has been selected for the supplemental expanding means 31 in the embodiment as illustrated in Fig. 2. Supplemental expansion means of varying sizes may be alternately employed, being limited only by the size of the passageway 32 through the collet base portion 21. In order to obtain axial alignment of the supplemental expansion means 31 with that of the shaft 20, during the application of force, and to prevent the conical end portion of the shaft from wedging to one side of the supplemental expanding means, the end of the conical portion of the shaft is provided with a concavity 33 adapted to partially receive ball 31 and guide it in an advanced path axially of the shaft.

In operation, for removing a bearing seated upon a surface having no continuing opening beyond the end of the bearing, as shown in Fig. 2, and as distinguished from the bearing seat shown in Fig. 3, the shaft 20 is retracted by holding the collet against rotation and unscrewing the shaft by suitable means such as a cross bar 34 sufficiently to allow the fingers 22 to contract into their normal contiguous relationship. The collet portion of the assembled tool is then passed into the passageway 25 of the bearing until the wedges 23 are brought to rest upon the members forming the bottom of the well. If the well is relatively deep it may be necessary to unscrew sleeve 9 or run it out on the shaft 20 by holding the collet against rotation and unscrewing the sleeve by the bar 11 to provide sufficient extension from the plate 15 to the wedges to reach the inner end of the bearing. When the wedges are seated flat upon the surface closing the end of the bearing, shaft 20 is held against rotation and sleeve 9 is rotated until the plate 15 is brought into contact with the walls 35 of the bearing well 36, whereupon sleeve 9 is held against rotation and shaft 20 rotated to expand the fingers and force the wedges between the inner end of the bearing and its seat. After the wedges have forced their entrance between the bearing end and its seat, the shaft is held against rotation and the sleeve 9 then rotated to apply compression upon the plate 15 simultaneously with the application of tension upon the collet 16 and sleeve 17 to draw the bearing from the well by the engagement of the wedges.

To remove a bearing from a well having a passageway 30 continuing axially of the passageway 25 through the bearing, the wedges are forced between the bearing end and its seat and the operation thereafter is similar to that described in connection with the removal of the bearing illustrated in Fig. 2, the distinction being that the supplemental finger-expanding means 31 is employed in the Fig. 2 operation since the expanding conical end of the shaft cannot protrude beyond the plane of the end of the wedges sufficiently to expand the wedges into engagement with the inner end of the bearing, whereas in the operation for the removal of the bearing illustrated in Fig. 3 the supplemental finger-expanding means need not be employed since the conical end portion of the shaft may be projected beyond the plane of the wedges into the passageway continuing axially of that of the bearing.

From the foregoing it will be seen that the tool provides means for wedgingly forcing a bearing from a seat on a plane with the end of the bearing without projecting the tool therebeyond and, of course, without engaging the inner walls of the bearing, which would otherwise normally result in the scoring or marring of the highly polished surface thereof.

Having described my invention and illustrated an embodiment by which the same may be practiced what I claim is:

1. In a tool for pulling a bearing ring or the like away from the bottom of a blind bearing seat within a socket, said tool comprising a sleeve member, a series of ring-engaging jaws extending from the end of said sleeve member, jaw-expanding means operable within said sleeve member for forcing the jaws radially outward to engage said ring, and tension means carried above the jaws by the jaw-expanding means for pulling the jaws axially from said seat to withdraw said ring, said jaws terminating in the form of wedges with the foremost sides lying in a plane substantially normal to the axis of the sleeve member, the other sides of said wedges tapering outwardly to sharp edges on a plane beneath the extremities of all other elements of the composite tool, whereby the wedges may be extended into the opening of the ring, held against the bottom of the blind bearing seat, the sharp edges of the wedges then forced between the back end of the ring and the bottom of the bearing seat to engage the seated end of the ring, and the engaged ring then pulled from the socket by the tension means without damagingly engaging the inner surface of the bearing ring.

2. In a structure as defined in claim 1, wherein the wedges are carried on the outer ends of the segments of a spring collet, wherein the collet body is internally tapered and the collet has a sleeveline shank which is internally threaded, wherein the means for forcing the jaws radially outward is a shaft, the forward end of which is tapered to suit the taper in the collet, and the remainder is externally threaded to suit the internal threads in the collet shank, and wherein the means for moving said jaws axially is an internally threaded sleeve fitted to the external threads on said shaft.

3. In a structure as defined in claim 1, wherein the means for forcing the jaws radially outward is a shaft, the forward end of which is provided with a concavity adapted to serve as a socket or seat to receive a spherical jaw expander to be moved by the shaft along the axis thereof.

CLARENCE L. MEYER.